Patented Apr. 24, 1928.

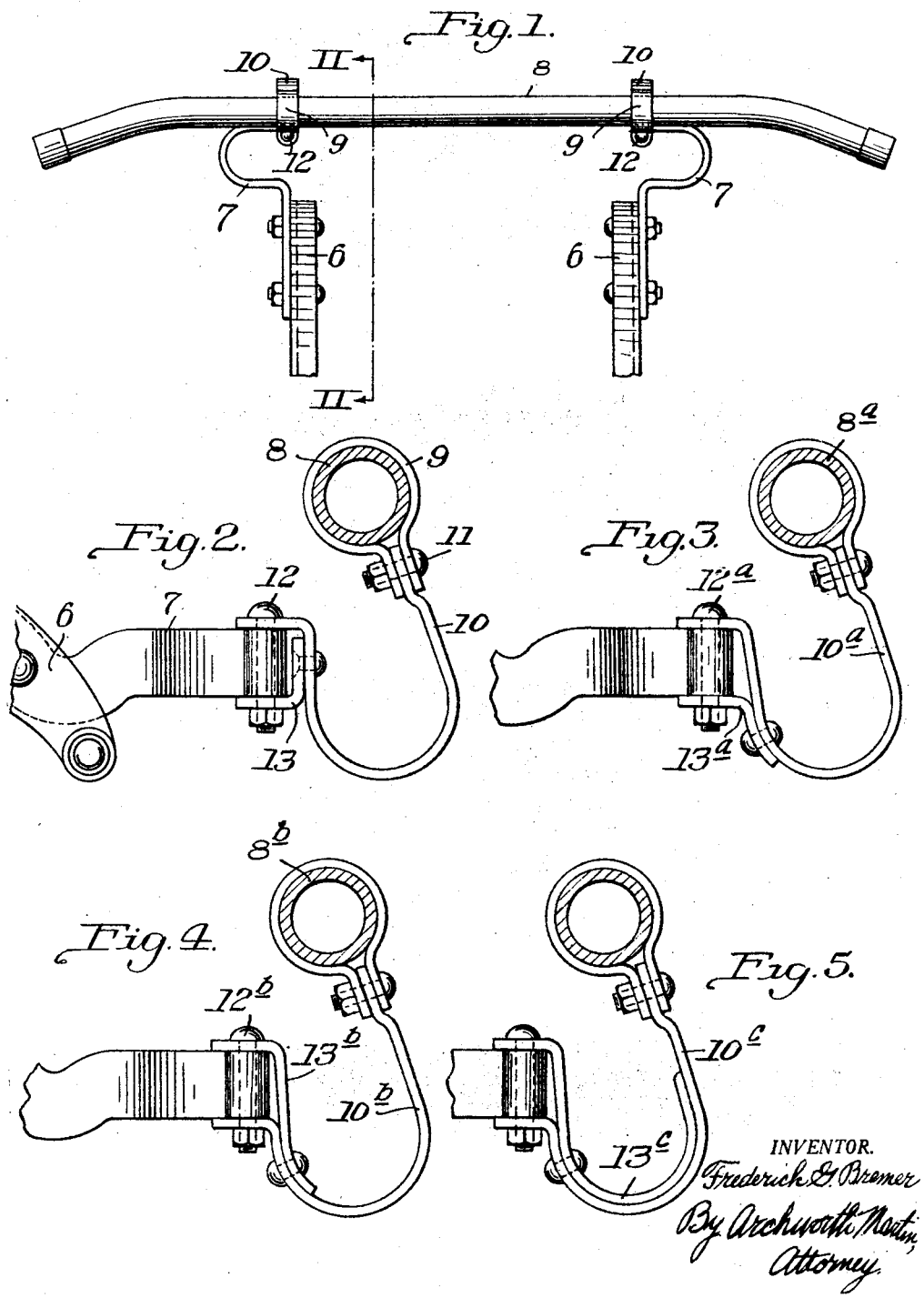

1,667,529

UNITED STATES PATENT OFFICE.

FREDERICK G. BREMER, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER.

Application filed July 26, 1927. Serial No. 208,493.

My invention relates to automobile bumper structures such as are employed at the front and rear ends of motor vehicles for absorbing the force of impacts.

One object of my invention is to provide an improved manner of yieldably supporting impact bars of the rigid type.

Another object of my invention is to provide an improved form of buffer springs for automobile bumpers.

One form which my invention may take is shown in the accompanying drawing, wherein Figure 1 is a plan view of the bumper structure mounted upon the forward portion of a vehicle frame; Fig. 2 is a view, on an enlarged scale, taken on the line II—II of Fig. 1, and Figs. 3, 4 and 5 each show a modification of the device of Fig. 2.

This invention includes modifications of the form of device described and claimed in my copending application Serial No. 207,178, filed July 20, 1927.

Referring to Figs. 1 and 2 of the drawing, I have represented portions of the side frames of an automobile by the numerals 6. Bracket arms 7, preferably of spring steel and curved in a horizontal plane are secured to the frame members 6.

A bumper bar 8 is shown as of tubular form in cross section, but may be of various other shapes. Clamping collars 9 are provided for supporting the bumper bar upon the forward ends of buffer springs 10 that are curved in vertical planes, the forward ends of such springs being pivotally connected to the collars 9 by means of bolts 11. The rear ends of the springs 10 are disposed in a horizontal plane and perforated for the reception of pivot bolts 12 that extend through eyes formed in the outer ends of the bracket arms 7.

A brace member 13 is riveted to each of the springs 10 and is also pivotally connected to its associated bracket arm 7, by means of one of the pivot bolts 12.

From the foregoing, it will be seen that the buffer springs 10 are pivotally connected at their front and rear ends to the bar 8 and the bracket arms 7, respectively, the axes of such pivots being disposed at approximately right angles to one another. Upon deflection of the bar 8 by reason of an impact or otherwise, the parts, by reason of the resiliency of the members 7 and 10 and of the pivotal connections referred to will be restored to their normal positions as shown in Fig. 1, upon removal of the deflecting force. The braces 13 serve to reinforce the buffer springs 10 at their rear ends and thereby reduce the tendency of the springs to become broken or permanently distorted at points adjacent to their pivots 12.

Referring to Fig. 3, I show a structure similar to Fig. 2, but wherein the brace member 13$^a$ extends forwardly for some distance, in abutting relation to a curved portion of the buffer spring 10$^a$, to afford reinforcement at a point farther removed from the rear pivotal connection of the buffer spring than in the case of Fig. 2.

In Fig. 4, the buffer spring 10$^b$ is shown as braced by a member 13$^b$, the positions of the members 10$^b$ and 13$^b$ with respect to the pivot bolt 12$^b$ being reversed as compared to the arrangement shown in Fig. 3. In the case of Fig. 3, the position of the brace 13$^a$ renders it more particularly effective to resist tendency of the spring 10$^a$ to be deflected in a clockwise direction about the pivot bolt 12$^a$, while in the case of Fig. 4, the brace 13$^b$ is more effective to resist tendency of the spring 10$^b$ to be deflected in a counter-clockwise direction. If it is anticipated that the tendency of impacts upon the bar 8$^a$ of Fig. 3 will be to force it downward, the brace 13$^a$ is especially suitable to resist such deflection, while if conditions are such that the bar 8$^b$ of Fig. 4 will tend to be deflected upwardly under impacts, the brace 13$^b$ may be the more desirable.

In Fig. 5, I show a structure similar to that of Fig. 4, but wherein the brace 13$^c$ is extended for some distance within the curve of the buffer spring 10$^c$, thus not only affording a support similar to that of the brace 13$^b$, but also serving to reinforce the body portion of the buffer spring 10$^c$.

I claim as my invention:—

1. Bumper structure comprising a bumper bar, a curved buffer spring pivotally connected at its outer end to said bar, a brace connected to said buffer spring at a point adjacent to its inner end, and means for connecting the inner ends of said spring and brace to a vehicle frame, on an axis transverse to the axis of the first-named pivotal connection.

2. Bumper structure comprising a buffer spring curved in a vertical plane, a bumper bar connected to the outer end of said spring, a brace member secured to said spring and having its rear end in vertically spaced relation to the inner end of the spring, and means for connecting the last-named ends to a support.

3. Bumper structure comprising a buffer spring curved in a vertical plane, a bumper bar connected to the outer end of said spring, a brace member secured to said spring and having its rear end in spaced relation to the inner end of the spring, and means for connecting the last-named ends to a support, the said brace having a curved portion lying in abutting engagement with the buffer spring for a portion of its length.

4. Bumper structure comprising a buffer spring curved in a vertical plane, a bumper bar connected to the outer end of said spring, a yieldable supporting arm, a brace member secured to said spring and having its rear end in spaced relation to the inner end of the spring, and means for pivotally connecting the last-named ends to a support.

5. Bumper structure comprising a buffer spring curved in a vertical plane, a bumper bar connected to the outer end of said spring, a yieldable supporting arm, a brace member secured to said spring and having its rear end in spaced relation to the inner end of the spring, and means for pivotally connecting the last-named ends to a support on a vertical axis.

6. Bumper structure comprising a curved buffer spring, a bumper bar connected to the outer end of said spring, a brace member secured to said spring and having a free end in spaced relation to the inner end of the spring, and means for connecting the last-named ends to a support.

7. Bumper structure comprising a bumper bar, a curved buffer spring pivotally connected at its outer end to said bar, a brace connected to said buffer spring at a point adjacent to its inner end, and means for connecting the inner ends of said spring and brace to opposite sides of a support, for movement on an axis transverse to that of the first-named pivotal connection.

8. Bumper structure comprising a buffer spring, a bumper bar connected to the outer end of said spring, a brace member secured to said spring and having its rear end in spaced relation to the inner end of the spring, and means for connecting the last-named ends to a support, the said brace having a portion lying in abutting engagement with the buffer spring for such distance beyond its point of attachment thereto as to reinforce said spring against bending.

In testimony whereof I, the said FREDERICK G. BREMER, have hereunto set my hand.

FREDERICK G. BREMER.